United States Patent
Zhao et al.

(10) Patent No.: US 10,516,875 B2
(45) Date of Patent: Dec. 24, 2019

(54) METHOD AND APPARATUS FOR OBTAINING DEPTH IMAGE BY USING TIME-OF-FLIGHT SENSOR

(71) Applicant: SAMSUNG ELECTRONICS CO., LTD., Suwon-si (KR)

(72) Inventors: Ji Zhao, Beijing (CN); Wen Zhou, Beijing (CN); Haitao Wang, Beijing (CN); Yonghwa Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 15/410,127

(22) Filed: Jan. 19, 2017

(65) Prior Publication Data
US 2017/0214901 A1    Jul. 27, 2017

(30) Foreign Application Priority Data

Jan. 22, 2016   (CN) .......................... 2016 1 0044750
Feb. 19, 2016   (KR) .......................... 10-2016-0019783

(51) Int. Cl.
| | | |
|---|---|---|
| H04N 7/12 | (2006.01) | |
| H04N 11/02 | (2006.01) | |
| H04N 11/04 | (2006.01) | |
| H04N 13/254 | (2018.01) | |
| G06T 5/00 | (2006.01) | |
| G06T 5/50 | (2006.01) | |
| G06T 7/521 | (2017.01) | |
| G06T 7/55 | (2017.01) | |
| H04N 13/271 | (2018.01) | |
| H04N 13/128 | (2018.01) | |
| G01S 17/36 | (2006.01) | |
| G01S 7/497 | (2006.01) | |
| H04N 13/00 | (2018.01) | |

(52) U.S. Cl.
CPC .......... *H04N 13/254* (2018.05); *G01S 7/497* (2013.01); *G01S 17/36* (2013.01); *G06T 5/003* (2013.01); *G06T 5/50* (2013.01); *G06T 7/521* (2017.01); *G06T 7/55* (2017.01); *H04N 13/128* (2018.05); *H04N 13/271* (2018.05); *G06T 2207/10048* (2013.01); *G06T 2207/20076* (2013.01); *G06T 2207/20201* (2013.01); *H04N 2013/0081* (2013.01); *H04N 2013/0085* (2013.01)

(58) Field of Classification Search
None
See application file for complete search history.

(56) References Cited

U.S. PATENT DOCUMENTS

| | | |
|---|---|---|
| 7,110,024 B1 | 9/2006 | Silverbrook et al. |
| 7,643,062 B2 | 1/2010 | Silverstein et al. |
| 7,773,115 B2 | 8/2010 | Estevez et al. |
| 8,508,606 B2 | 8/2013 | Liu |
| 8,509,559 B2 | 8/2013 | Yang et al. |
| 8,929,447 B2 | 1/2015 | Kung et al. |

(Continued)

*Primary Examiner* — Talha M Nawaz
(74) *Attorney, Agent, or Firm* — Sughrue Mion, PLLC

(57) ABSTRACT

A method and an apparatus for obtaining a depth image by using a time-of-flight sensor may generate a depth image based on a plurality of images in which a motion blur area caused by a movement of an object was corrected. In this case, since the motion blur area is corrected after an initial phase difference of emitted light is compensated, an accuracy of the depth image may be enhanced.

19 Claims, 15 Drawing Sheets
(2 of 15 Drawing Sheet(s) Filed in Color)

(56) References Cited

U.S. PATENT DOCUMENTS

| | | |
|---|---|---|
| 8,995,781 B2 | 3/2015 | Cho et al. |
| 9,042,672 B2 | 5/2015 | Wang et al. |
| 9,042,673 B2 | 5/2015 | Cho et al. |
| 2010/0013928 A1* | 1/2010 | Haug ................. B60R 1/00 348/148 |
| 2012/0154462 A1* | 6/2012 | Hempson ............ G09G 3/342 345/691 |
| 2015/0116353 A1* | 4/2015 | Miura ................. G06T 11/60 345/632 |
| 2016/0178358 A1* | 6/2016 | Miyasaka ........... G01B 11/25 356/610 |

* cited by examiner

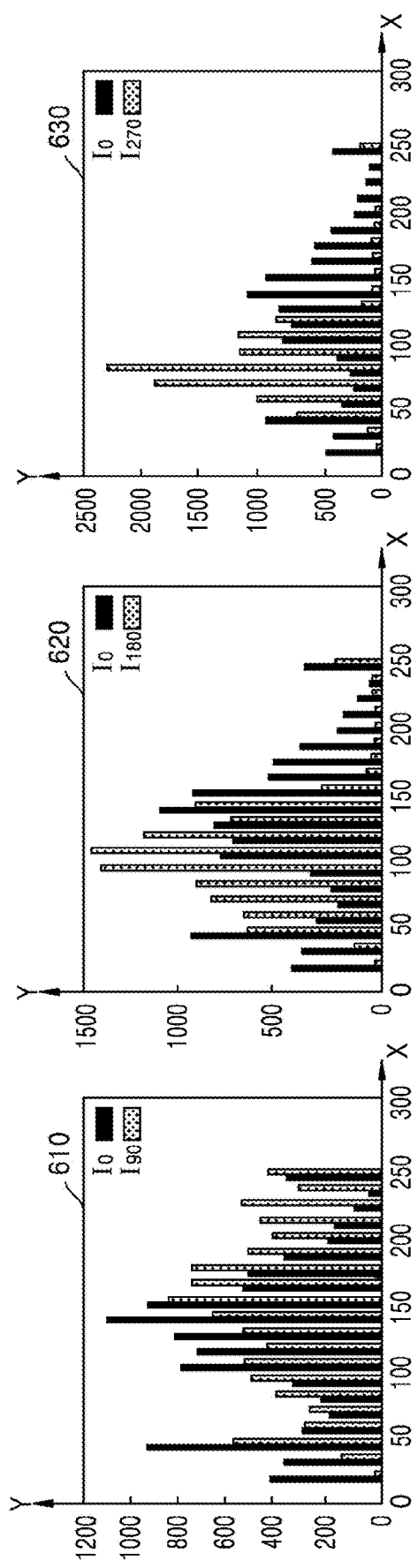

FIG. 9

Algorithm of motion deblurring

Input: four IR images S = {Im0,Im90,Im180,Im270}; minV, maxV,pathchSize,
Output: four transformed IR images S_new = {Im90_new, Im180_new,Im270_new}, depth image I_depth blurMask = detectBlurArea(Im0,Im90,Im180,Im270);
blurMask = erode(blurMask,elem);
blurMask = dilate(blurMask,elem);
ImTgt = normalizeImage(Im0,minV,maxV);
U1 = imageHistgram(ImTgt,blurMask);
for i = 1:3
   ImSrc = normalizeImage(S{i+1},minV,maxV);
   U2 = imageHistgram(ImSrc,blurMask);
   T = transfromCdf(U1,U2);
   ImSrc = performTransform(U1,U2,T);
   NNF = patchMatch(ImSrc,ImTgt,blurMask,patchSize);
   S_new{i} = reconstrctImage(ImSrc,NNF,minV,maxV);
end
I_depth = calculateDepth(Im0,Im90_new,Im180_new,Im270_new);

METHOD AND APPARATUS FOR OBTAINING DEPTH IMAGE BY USING TIME-OF-FLIGHT SENSOR

CROSS-REFERENCE TO RELATED APPLICATIONS

This application claims priority from Chinese Patent Application No. 201610044750.8, filed on Jan. 22, 2016 in the State Intellectual Property Office of the People's Republic of China, and Korean Patent Application No. 10-2016-0019783, filed on Feb. 19, 2016 in the Korean Intellectual Property Office, the disclosures of which are incorporated herein by reference in their entireties.

BACKGROUND

1. Field

Apparatuses and methods consistent with exemplary embodiments relate to obtaining a depth image by using a time-of-flight (TOF) sensor.

2. Description of the Related Art

Research on three-dimensional (3D) cameras, motion sensors, laser radars (LADARs), etc. that can acquire information about a distance to an object has been increasing. Especially, the importance of 3D content has been emphasized along with the development of and increased demand for 3D display apparatuses which may display an image with a sense of depth. Accordingly, research is underway on various apparatuses for obtaining a depth image to be used by a general user to directly produce 3D content.

Depth information about a distance between a surface of the object and an apparatus for obtaining a 3D image may be obtained via a stereo vision method using two cameras or a traiangulation using a structured light and a camera. However, these methods may not obtain detailed depth information because the accuracy of depth information may rapidly decrease as the distance to the object increases and may be dependent upon a surface condition of the object.

Recently, a time-of-flight (TOF) method has been used along with an apparatus for obtaining a depth image. The TOF method measures the flight time of an illumination light reflected from the object and received by a light receiver after the light is emitted to the object. According to the TOF method, a series of processes for extracting depth information may be performed such as emitting light of a certain wavelength (e.g., near infrared of about 850 nm) via an illuminating optical system including a light emitting diode (LED) or a laser diode (LD), receiving light of an identical wavelength reflected from the object by the light receiver, and modulating the received light via a light shutter. Various TOF technologies corresponding to the series of light processes have been developed.

SUMMARY

One or more exemplary embodiments provide a method and an apparatus for correcting motion blur of a depth image by using a TOF sensor.

According to an aspect of an exemplary embodiment, there is provided a method of obtaining a depth image including: emitting light having a plurality of phases toward an object, the light being reflected from the object; detecting a motion blur area in a plurality of original images obtained from the reflected light, the plurality of original images comprising a reference image and a plurality of remaining images; compensating the plurality of original images for an intensity difference between the plurality of original images, based on differences between the plurality of phases; correcting the motion blur area in the compensated plurality of remaining images; and generating the depth image based on the reference image and the compensated plurality of remaining images that comprise the corrected motion blur area.

The compensating may include: selecting the reference image from the plurality of original images; and adjusting a cumulative distribution function for an intensity of the reflected light corresponding to the plurality of remaining images based on a cumulative distribution function for an intensity of the reflected light corresponding to the reference image.

The correcting the motion blur area may include correcting the motion blur area based on a PatchMatch algorithm.

The emitting the light may include sequentially emitting the light to the object, and the method may further include modulating the reflected light via an optical shutter to obtain the plurality of original images.

The plurality of phases respectively correspond to phases of 0°, 90°, 180°, and 270°, and the plurality of original images may include a first original image corresponding to the 0°, a second original image corresponding to the 180°, a third original image corresponding to the 90°, and a fourth original image corresponding to the 270°. The first original image may correspond to the reference image. The second original image, the third original image, and the fourth original image may correspond to the plurality of remaining images.

The generating the depth image may include calculating depth information, based on phase information and modulation frequencies by using the reflected light corresponding to the first original image and the reflected light corresponding to the second through fourth corrected images.

The detecting the motion blur area may detect the motion blur area from the plurality of original images, when a difference between a first group, denoting a sum of the intensity of the reflected light corresponding to the first and second original images, and a second group, denoting a sum of the intensity of the reflected light corresponding to the third and fourth original images, is more than or equal to a threshold value.

The detecting the motion blur area may include selecting two original images from the plurality of original images; and detecting the first area as the motion blur area, when the intensity difference between a first area included in the two original images and the reflected light corresponding to the first area is determined to be caused by a movement of the object.

The motion blur area may be determined as an identical area in the plurality of original images.

According to an aspect of another exemplary embodiment, there is provided a non-transitory computer readable storage medium storing a program that is executable by a computer to perform the method.

According to an aspect of another exemplary embodiment, there is provided an apparatus obtaining a depth image including: a detector configured to detect a motion blur area from a plurality of original images obtained by emitting light having a plurality of phases toward an object, the light being reflected from the object, the plurality of original images comprising a reference image and a plurality of remaining images; a corrector configured to compensate the plurality of original images for intensity differences between the plurality of original images, based on differences between the plurality of phases, and correct the motion blur area in the compensated plurality of remaining images; and a depth image processor configured to generate the depth image based on the reference image and the compensated plurality of remaining images that comprise the corrected motion blur area.

The corrector may be configured to select the reference image from the plurality of original images, and adjust a cumulative distribution function for an intensity of the reflected light corresponding to the plurality of remaining images based on a cumulative distribution function for an intensity of the reflected light corresponding to the reference image.

The corrector may be configured to correct the motion blur area based on a PatchMatch algorithm.

The apparatus may further include: a light source configured to sequentially emit the light to the object; an optical shutter configured to modulate wave patterns of the reflected light by changing a transmissivity of the reflected light; and an imaging unit configured to generate the plurality of original images via the reflected light modulated by the optical shutter.

The apparatus may further include a driver configured to apply driving voltages to the light source and the optical shutter; and a controller configured to control operations of the driver and the imaging unit.

The controller may be configured to control the driver so that the sequentially emitted light has phases of 0°, 180°, 90°, and 270°, respectively, and the plurality of original images may include a first original image corresponding to the 0°, a second original image corresponding to the 180°, a third original image corresponding to the 90°, and a fourth original image corresponding to the 270°. The first original image may correspond to the reference image. The second original image, the third original image, and the fourth original image may correspond to the plurality of remaining images.

The depth image processor may be configured to calculate depth information based on obtained phase information and modulation frequencies by using the reflected light corresponding to the first original image and the reflected light corresponding to the second through fourth corrected images.

The detector may be configured to detect the motion blur area from the plurality of original images, when a difference between a first group, denoting a sum of the intensity of the reflected light corresponding to the first and second original images, and a second group, denoting a sum of the intensity of the reflected light corresponding to the third and fourth original images, is greater than or equal to a threshold value.

The detector may be configured to select two original images from the plurality of original images and detect the first area as the motion blur area based on an intensity difference between the first area in the two original images.

The motion blur area may be determined as an identical area in the plurality of original images.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and/or other aspects will be more apparent by describing certain exemplary embodiments, with reference to the accompanying drawings, in which:

FIG. 6A shows histograms for comparing an intensity of a CMOS image sensor (CIS) output signal corresponding to a reference image and the intensity of the CIS output signals corresponding to remaining images according to an exemplary embodiment;

FIG. 9 is a diagram illustrating an algorithm generating a depth image after having removed the motion blur phenomenon according to an exemplary embodiment;

DETAILED DESCRIPTION

Figure 1:
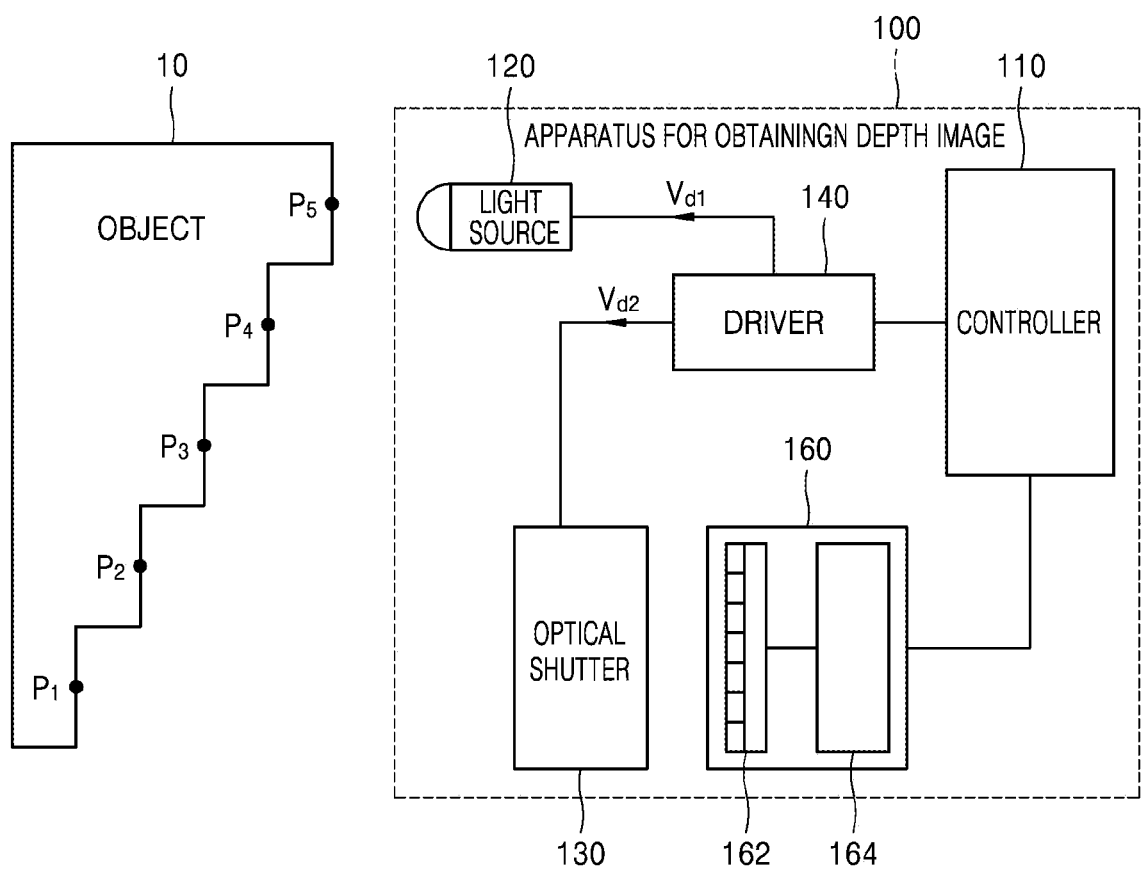
FIG. 1 illustrates an apparatus for obtaining a depth image according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Throughout the specification, when a portion is connected to another portion, the case may include not only being directly connected but also being electrically connected with other elements therebetween. When a portion includes a composing element, the case may denote further including other composing elements without excluding other composing elements unless otherwise described. The terms "... unit" or "module" may denote a unit performing one of specific function or movement and may be realized by hardware, software or a combination of hardware and software.

Throughout the specification, the term "consists of" or "includes" should not be interpreted as meaning that all of various elements or steps described in the specification are absolutely included, and should be interpreted as meaning that some of elements or steps may not be included or that additional elements or steps may be further included.

While such terms as "first," "second," etc., may be used to describe various components, such components must not be limited to the above terms. The above terms are used only to distinguish one component from another.

FIG. 1 illustrates an apparatus 100 for obtaining a depth image according to an exemplary embodiment.

Referring to FIG. 1, the apparatus 100 for obtaining a depth image may include a light source 120 configured to emit light to an object 10, an optical shutter 130, provided on a moving path of light reflected from the object 10, configured to modulate a wave pattern of reflected light by changing transmissivity of the reflected light, a driver 140 configured to apply driving voltages to the light source 120 and the optical shutter 130, and a controller 110 configured to control the driver 140. In addition, the apparatus 100 for obtaining a depth image may include an imaging unit (e.g., image processor) 160 configured to receive reflected light having passed through the optical shutter 130, extract a phase difference between light emitted from the light source 120 to the object 10 and the reflected light, and obtain depth information about the object 10 based on the phase difference. The controller 110 and the imaging unit 160 may be implemented by one or more microprocessors.

The light source 120 may emit light toward the object 10. The light source 120 may emit light having a wavelength in a near infrared (NIR) range between about 800 nm and about 1000 nm. However, the type of light that the light source 120 may emit is not limited thereto. In addition, when light having an infrared wavelength is emitted, light emitted from the light source 120 may not be visible to a human eye. The light source 120 may include a light emitting diode (LED) or a laser diode (LD). The light source 120 may be connected to the driver 140.

The driver 140 may operate the light source 120 by applying a driving voltage $V_{d1}$ to the light source 120. An intensity and a wavelength of light emitted from the light source 120 may vary, depending on a magnitude of the driving voltage $V_{d1}$ applied by the driver 140. For example, when the magnitude of the driving voltage $V_{d1}$ applied to the light source 120 increases, the intensity and the wavelength of light emitted from the light source 120 may increase.

In addition, light emitted from the light source 120 may include a pulse wave having a certain shape. For example, light emitted from the light source 120 may have a wave pattern of a sinusoidal wave, a ramp wave or a square wave. In addition, light emitted from the light source 120 may be reflected from the object 10. Thus, depending on a distance between the object 10 and the light source 120, the difference between the phase of light emitted from the light source 120 and the phase of light reflected from the object 10 and entering the optical shutter 130 may vary.

The optical shutter 130 may modulate the wave pattern of the reflected light by varying a degree of transmission of the reflected light reflected from the object 10. In this case, a modulated form of the reflected light by the optical shutter 130 may change depending on the phase of the reflected light entering the optical shutter 130. In other words, depending on the distance between the object 10 and the light source 120, the phase of the reflected light entering the optical shutter 130 may be changed and accordingly, the wave pattern of the reflected light modulated by the optical shutter 130 may be changed. Transmissivity of the optical shutter 130 may vary depending on a driving voltage $V_{d2}$ that the driver 140 may apply to the optical shutter 130.

The imaging unit 160 may obtain depth information of the object 10 by receiving the reflected light having passed through the optical shutter 130. The imaging unit 160 may include an imaging element 162 and a calculation module 164 configured to calculate depth information. The imaging element 162 may detect the reflected light modulated by the optical shutter 130. In the case of measuring a distance to a single point of the object 10, the imaging element 162 may include, for example, one photo diode or one photo sensor. However, in the case of simultaneously measuring distances to a plurality of points P1, P2, P3, P4, and P5 on the object 10, the imaging element 162 may include a plurality of photo diodes or two-dimensional or one-dimensional array of a plurality of photo sensors. For example, the imaging element 162 may include a charge coupled device (CCD) or a CMOS image sensor (CIS) having two-dimensional array; however, it is not limited thereto. The imaging element 162 may measure the intensity of the reflected light having passed through the optical shutter 130. The intensity of light measured by the imaging element 162 may depend on the wave pattern of modulated light.

The calculation module 164 may calculate depth information of the object 10 from image information measured by the imaging element 162. The calculation module 164 may calculate the phase difference between the reflected light and light emitted from the light source 120 by using the intensity of the reflected light measured by the imaging element 162. In addition, the calculation module 164 may calculate the distance between the light source 120 and the object 10 based on the phase difference to obtain depth information.

The controller 110 may control the driver 140 to change the transmissivity of the optical shutter 130. In greater detail, the controller 110 may control the driver 140 to adjust the driving voltage $V_{d1}$ applied to the light source 120 and the driving voltage $V_{d2}$ applied to the optical shutter 130. For example, when the distance between the light source 120 and the object 10 is far, the light source 120 may emit light at a high output. However, when the distance between the light source 120 and the object 10 is close, depth information about the object 10 may be obtained even though the light source 120 may emit light at a low output. Thus, when the distance between the light source 120 and the object 10 is close, reducing the output of light of the light source 120 may be recommendable from an aspect of power consumption efficiency. In addition, an occurrence of light saturation in the imaging element 162 of the imaging unit 160 may be prevented by adjusting the light output of the light source 120.

Figure 2A:
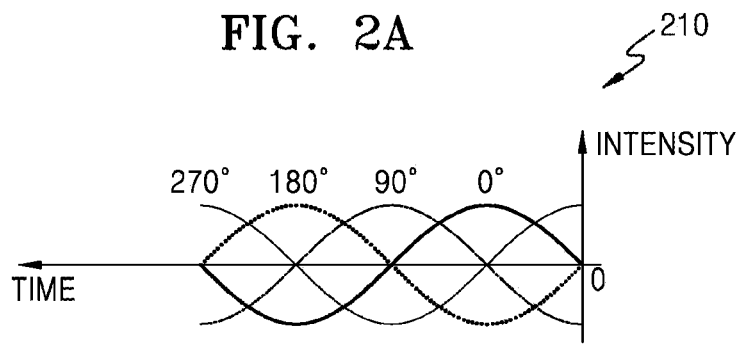
FIGS. 2A, 2B, and 2C illustrate an operation method of the apparatus for obtaining a depth image according to an exemplary embodiment.
Figure 2B:
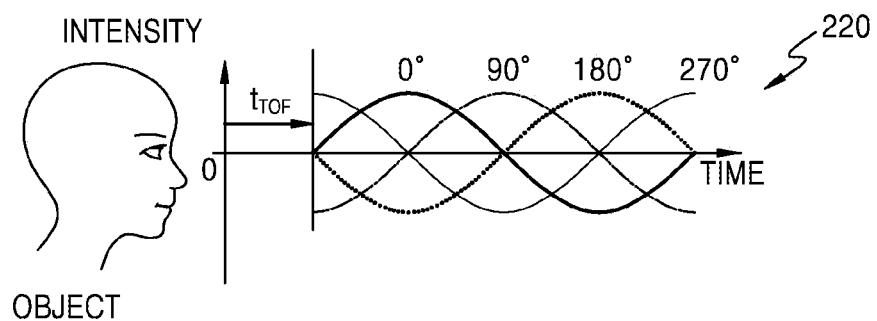
Figure 2C:
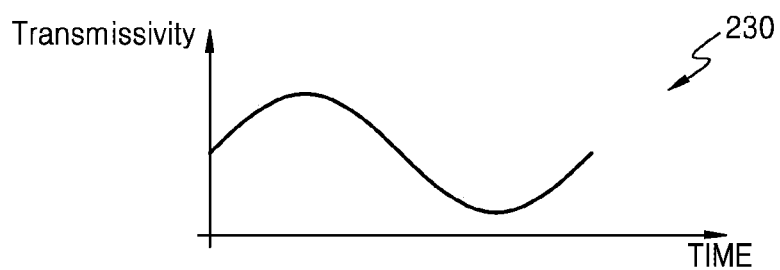

FIGS. 2A, 2B, and 2C are illustrating an operation method of the apparatus 100 for obtaining a depth image according to an exemplary embodiment.

FIG. 2A shows that the intensity of light 210 emitted from the light source 120 changes over time. FIG. 2B shows that the intensity of the reflected light 220 entering the optical shutter 130 changes over time. FIG. 2C shows that the transmissivity of the optical shutter 130 changes over time.

The light source 120 may sequentially emit a plurality of emitted light 210 to the object 10. The plurality of emitted light 210 may be emitted to the object 10 with a certain idle time. In addition, the plurality of emitted light 210 may be emitted from the light source 120 with respectively different phase. For example, when the light source 120 emits N of the emitted light to the object 10, the phase difference of light emitted with an adjacent time interval among emitted light may be equal to a value of 360 divided by N. In other words, when N is 4, phases of the emitted light may be 0°, 90°, 180°, and 270°; however, they are not limited thereto.

When the light source 120 emits a plurality of light 210 to the object 10 with the idle time, reflected light 220 reflected by the object 10 may independently pass through the optical shutter 130 and enter the imaging unit 160. The transmissivity of the optical shutter 130 may vary over time as illustrated in the graph of FIG. 2C. Thus, the wave pattern of the reflected light 220 may be modulated as the reflected light 220 passes through the optical shutter 130. The wave pattern of modulated, reflected light 220 may depend on the phases of the reflected light 220 and changes in the transmissivity of the optical shutter 130 over time. The imaging unit 160 may extract the phase differences between the reflected light 220 and the emitted light 210 via the reflected light 220 modulated by the optical shutter 130.

Figure 3:
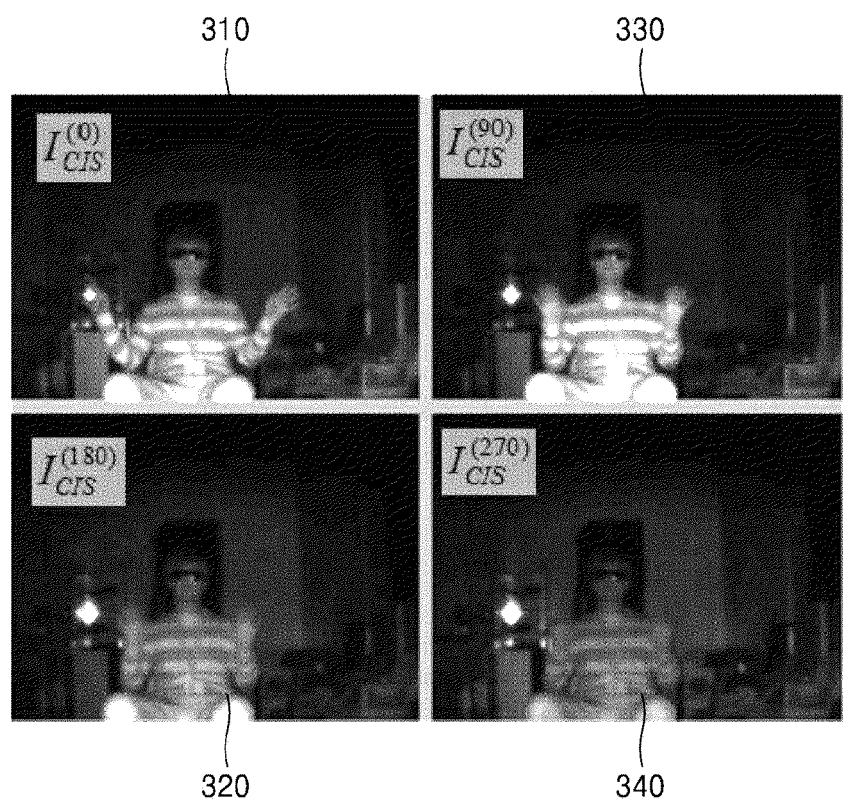
FIG. 3 illustrates a plurality of images according to an exemplary embodiment.

FIG. 3 is illustrating a plurality of images according to an exemplary embodiment.

As described above, the apparatus 100 may generate one depth image by sequentially obtaining the plurality of images from light which is emitted to an object and then reflected from the object towards the apparatus 100. Hereinafter, it is assumed that the plurality of images are infrared (IR) images. However, it will be understood by those of ordinary skill in the art that other types of images may be obtained also.

Referring to FIG. 3, the apparatus 100 may sequentially obtain four IR images corresponding to the plurality of emitted light with respective initial phases of 0°, 90°, 180°, and 270°. In this case, when shooting times of four IR images are different from each other, a motion blur may occur. For example, while four IR images are sequentially shot, the object may move or the apparatus 100 may shoot through recognizing different objects from each other as identical objects. Such motion blur phenomenon may frequently occur on a boundary surface of a moving object and also when the object moves at a fast speed or shooting is performed at a slow speed.

Referring to FIG. 3, the motion blur phenomenon occurring due to a movement of the object 10 in the plurality of images generated via CIS output signals $I_{CIS}^{(0)}$, $I_{CIS}^{(90)}$, $I_{CIS}^{(180)}$, $I_{CIS}^{(270)}$ obtained by the imaging unit 160. In greater detail, since shooting of images 310 through 340 was performed while the object was waving hands, the motion blur phenomenon occurred.

In this case, the motion blur phenomenon may cause a greater effect to the depth image than to a conventional image. For example, when the motion blur phenomenon occurs during conventional shooting, the boundary surface of the moving object may be determined based on an averaged image including other adjacent objects, for example, averaged brightness or averaged color. However, in the case of the depth image, a completely different result may be deducted in a process of calculating the depth image due to the motion blur phenomenon. Thus, it is important to remove a motion blur area when the depth image is to be generated.

Below, a method of detecting the motion blur area from four images (e.g., a first image corresponding to 0°, a second image corresponding to 180°, a third image corresponding to 90°, and a fourth image corresponding to 270°) and in the case of an occurrence of the motion blur, a method of correcting an image or a pixel in which the motion blur has occurred, are described in detail to effectively remove the motion blur area generated due to a movement of the object 10. In drawings below, signals obtained by the imaging unit 160 to generate the plurality of images are denoted as CIS output signals; however, the imaging element 164 is not limited to the CIS output signals.

Figure 4:
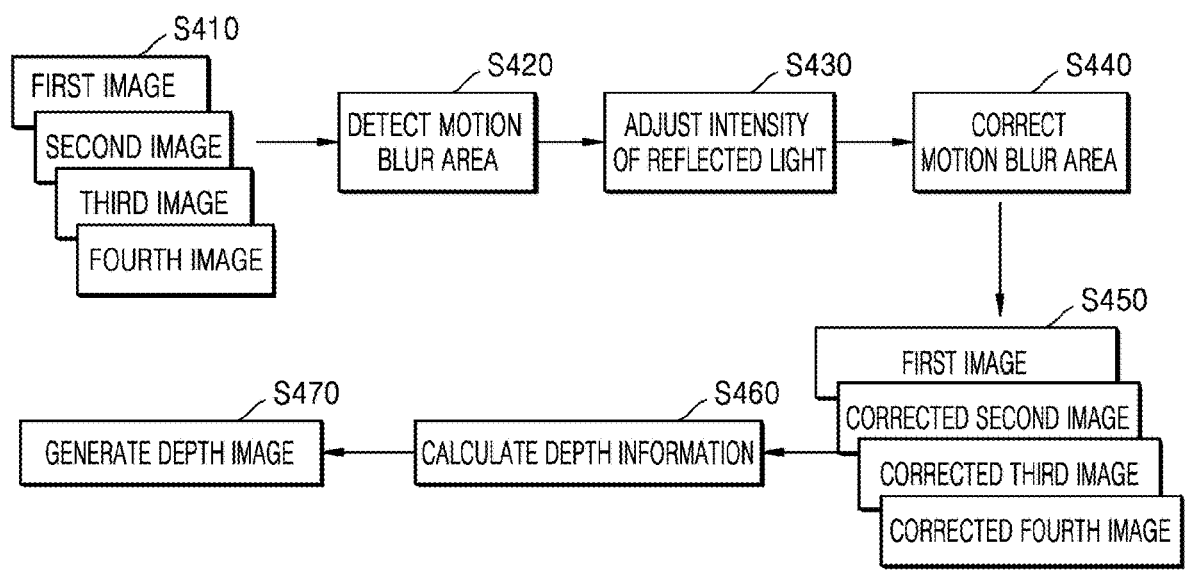
FIG. 4 is a flowchart of a method of revising a motion blur area according to an exemplary embodiment.

FIG. 4 is a flowchart of a method of revising a motion blur area according to an exemplary embodiment.

Referring to FIG. 4, the apparatus 100 for obtaining a depth image may obtain a plurality of images. In greater detail, the apparatus 100 may emit the light having respective initial phases of 0°, 90°, 180°, and 270° to the object 10 and sequentially obtain four images (operation S410) via the obtained, reflected light.

When the motion blur area is included in four images (operation S410), the apparatus 100 may detect the motion blur area included in the four images (operation S420).

For example, the apparatus 100 may detect the motion blur area according to the formula below.

$$|B_1 - B_2| \varepsilon \quad \text{[Formula 1]}$$

In this case, $B_1$ and $B_2$ may be respectively obtained via a plurality of CIS output signals, and may be respectively defined by Formulas 2 and 3. ε may be a threshold value and may be obtained via an analysis.

$$B_1 = I_{CIS}^{(0)} + I_{CIS}^{(180)} \quad \text{[Formula 2]}$$

Referring to Formula 2, $I_{CIS}^{(0)}$ may denote the CIS output signal corresponding to the emitted light with an initial phase of 0° and $I_{CIS}^{(180)}$ may denote the CIS output signal corresponding to the emitted light with an initial phase of 180°.

$$B_2 = I_{CIS}^{(90)} + I_{CIS}^{(270)} \quad \text{[Formula 3]}$$

Referring to Formula 3, $I_{CIS}^{(90)}$ may denote the CIS output signal corresponding to the emitted light with an initial phase of 90°, and $I_{CIS}^{(270)}$ may denote the CIS output signal corresponding to the emitted light with an initial phase of 270°. A unit of the CIS output signal is volt; however, it will be understood by those of ordinary skill in the art that the CIS output signal may be a signal of other type.

Referring to Formulas 1 through 3, it is possible to detect whether a certain area may be the motion blur area via the CIS output signal corresponding to the certain area included in the image. In addition, the motion blur area may be adjusted depending on a value of ε in Formula 1.

The apparatus 100 may detect the motion blur area according to another exemplary embodiment. In greater detail, differences in the CIS output signals of the plurality of images may occur due to the initial phase of the emitted light or the motion blur phenomenon. Thus, when differences in CIS output signals between the plurality of images are compensated for differences in signal intensity according to initial phase differences of the emitted light, the CIS output signal corresponding to the motion blur phenomenon may be determined, and the motion blur area may be detected.

For example, the apparatus 100 may select two arbitrary images from the plurality of images to analyze the intensity differences of CIS output signals corresponding to two images. Next, the apparatus 100 may compensate for a difference according to the initial phase of the emitted light, among causes of the intensity difference between CIS output signals corresponding to two images, and determine an area in which the intensity difference of CIS output signals occurs due to the motion blur phenomenon. In this case, a method using a cumulative distribution function of the intensity of the CIS output signal may be used to compensate for the difference according to the initial phase of the emitted light. When the motion blur area is detected after the difference according to the initial phase of the emitted light has been compensated, it will be understood by those of ordinary skill in the art that a process of detecting the motion blur area may be performed after a process of analyzing the cumulative distribution function.

A method of compensating for the difference according to the initial phase of the emitted light via the cumulative distribution function of the intensity of the CIS output signal will be described in detail with reference to drawings.

The apparatus 100 may correct the motion blur area (operation S440) after compensating for the difference according to the initial phase of the emitted light. In greater detail, a motion blur area of a reference image (e.g., the first image) corresponding to the detected may be replaced with a corresponding area from other remaining images except the reference image (e.g., the second through fourth images). When the motion blur area is corrected, the object may be viewed as fixed through the correcting, and thus, a calculation of depth information may be performed with higher accuracy than a calculation of depth information performed with original plurality of images.

The apparatus 100 may calculate depth information (operation S460) after correcting the motion blur area, via a plurality of corrected images with the motion blur area corrected and the reference image (operation S450). A method of calculating depth information will be described in detail with reference to drawings below.

Lastly, the apparatus 100 may generate depth information based on calculated depth information (operation S470).

Figure 5:
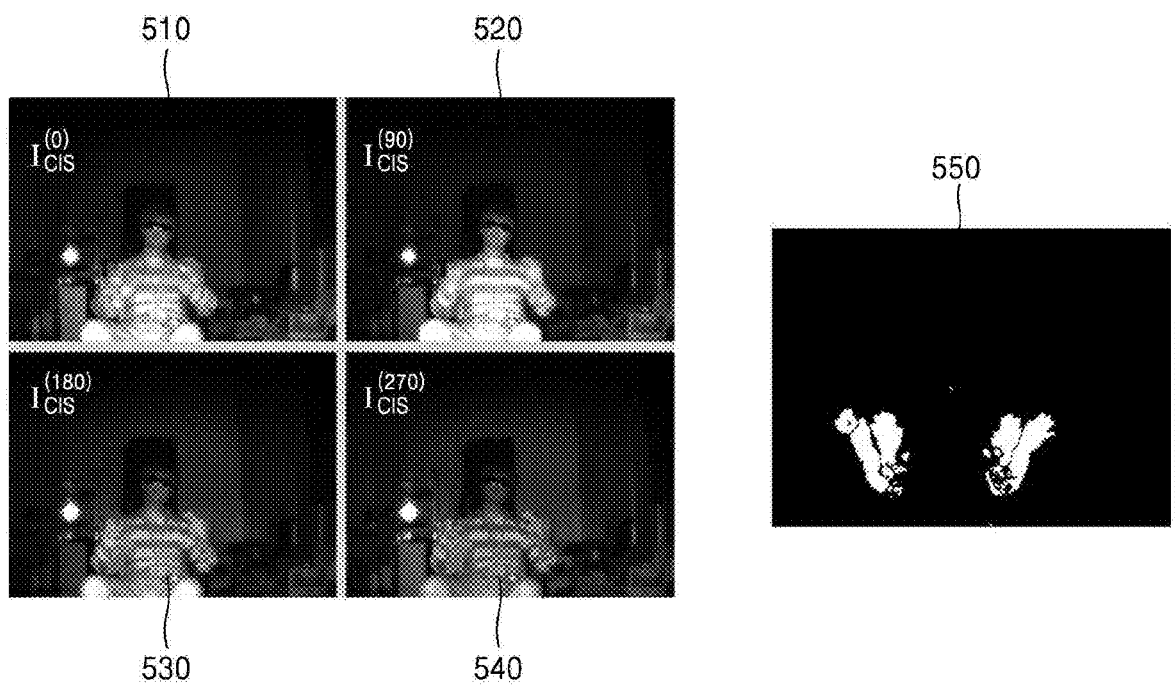
FIG. 5 is a diagram illustrating a motion blur area detected in a plurality of images according to an exemplary embodiment.

FIG. 5 is a diagram illustrating a motion blur area detected in a plurality of images according to an exemplary embodiment.

Referring to FIG. 5, motion blur areas included in four images 510 through 540 may be detected. In this case, the motion blur area 550 that is detected may be an identical area in the plurality of images.

The apparatus 100 may compensate the reflected light which is a basis for generating the plurality of images for the intensity differences of the reflected light according to the initial phase differences. In this case, the apparatus 100 may compensate for the intensity difference according to the initial phase via the cumulative distribution function of intensity of the reflected light. A method of compensating for the intensity difference according to the initial phase will be described in detail with reference to FIGS. 6A and 6B.

FIG. 6A shows histograms for comparing an intensity of the CIS output signal corresponding to a reference image and the intensity of the CIS output signals corresponding to remaining images according to an embodiment.

Referring to FIG. 6A, a reference signal in a first through third histograms 610 through 630 is the CIS output signal corresponding to the emitted light with the initial phase of 0°. The CIS output signal corresponding to the emitted light with the initial phase of 0° is determined as the reference signal according to an exemplary embodiment; however, it will be understood by those of ordinary skill in the art that other CIS output signal may be determined as the reference signal also.

In greater detail, the first histogram 610 may illustrate the intensity of the CIS output signal corresponding to the emitted light with the initial phase of 90° and the intensity of the reference signal. The second histogram 620 may illustrate the intensity of the CIS output signal corresponding to the emitted light with the initial phase of 180° and the intensity of the reference signal. Lastly, the third histogram 630 may illustrate the intensity of the CIS output signal corresponding to the emitted light with the initial phase of 270° and the intensity of the reference signal.

In this case, an x-axis of the histogram may have an identical unit as the CIS output signal and a y-axis may denote the number of pixels having the intensity of the corresponding CIS output signals. In addition, when the CIS output signal is a continuous function, the histogram may be obtained via quantization of the CIS output signal.

Referring to FIG. 6A, each CIS output signal illustrated in respective histograms 610 through 630 may have a different histogram from the reference signal. Each CIS output signal has a histogram different from the reference signal because of the difference in the initial phase and the motion blur phenomenon. Thus, when the difference of the CIS output signal according to the difference in the initial phase is compensated, the apparatus 100 may more precisely detect the motion blur area.

Figure 6B:
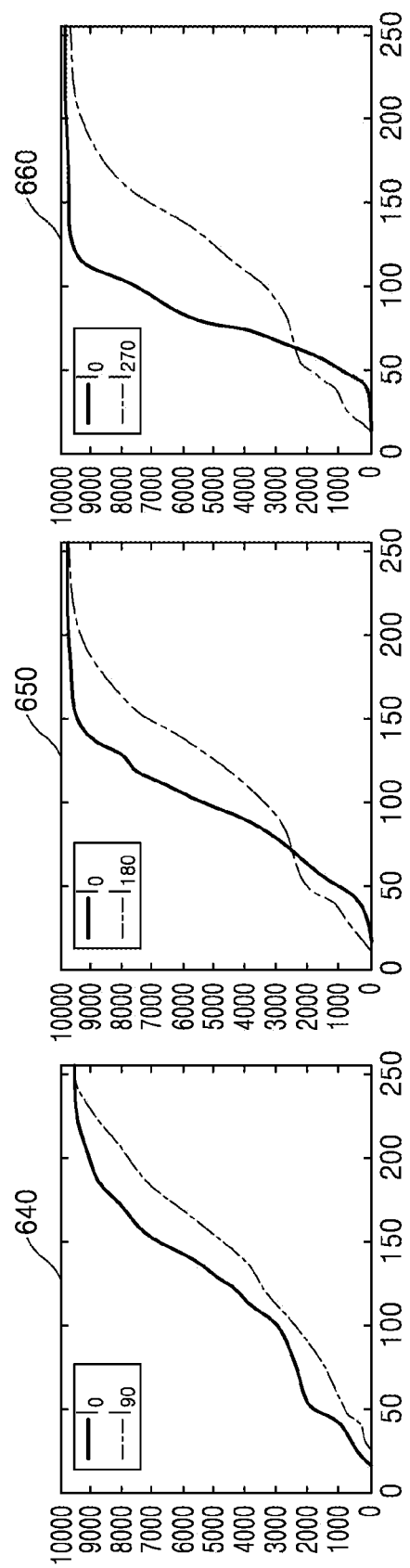
FIG. 6B shows graphs illustrating cumulative distribution functions for the intensity of the CIS output signal corresponding to the reference image and the intensity of the CIS output signals corresponding to remaining images according to an exemplary embodiment.

FIG. 6B shows graphs illustrating cumulative distribution functions for the intensity of the CIS output signal corresponding to the reference image and the intensity of the CIS output signal corresponding to remaining images according to an exemplary embodiment.

In greater detail, the reference signal in a first through third graphs 640 through 660 is the CIS output signal corresponding to the emitted light with the initial phase of 0°. The CIS output signal corresponding to the emitted light with the initial phase of 0° is determined as the reference signal; however, it will be understood by those of ordinary skill in the art that other CIS output signal may be determined as the reference signal. An x-axis of the histogram may have an identical unit as the CIS output signal and a y-axis may denote the accumulated number of pixels corresponding to the intensity of corresponding CIS output signals.

In greater detail, the first graph 640 may illustrate respective cumulative distribution functions for the intensity of the CIS output signal corresponding to the emitted light with the initial phase of 90° and for the intensity of the reference signal. The second 650 may illustrate respective cumulative distribution functions for the intensity of the CIS output signal corresponding to the emitted light with the initial phase of 180° and for the intensity of the reference signal. Lastly, the third graph 660 may illustrate respective cumulative distribution functions for the intensity of the CIS output signal corresponding to the emitted light with the initial phase of 270° and for the intensity of the reference signal.

Referring to 6B, each cumulative distribution function may have a different shape from the cumulative distribution function for the reference signal. When respective cumulative distribution functions corresponding to each CIS output signal is adjusted to be close to the cumulative distribution function corresponding to the reference signal, an image may be obtained which is compensated for the intensity difference of the CIS output signal due to the initial phase.

In other words, the apparatus 100 may compensate for the initial phase difference based on the cumulative distribution function, and then, may correct the motion blur area.

Figure 7:
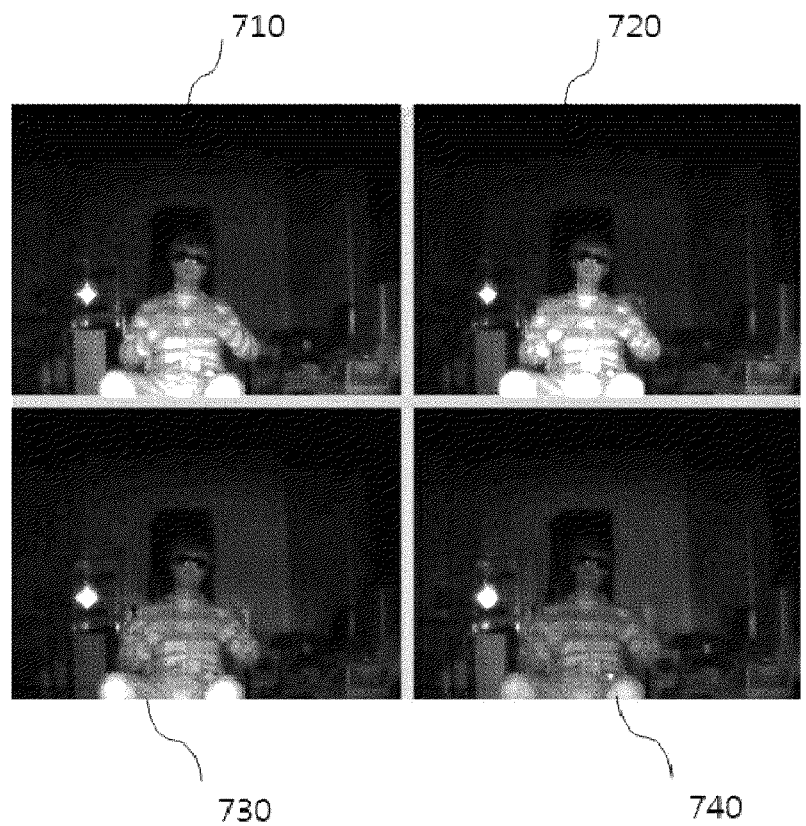
FIG. 7 illustrates corrected images of the motion blur area based on the PatchMatch technique according to an exemplary embodiment.

FIG. 7 is illustrating corrected images of the motion blur area based on the PatchMatch technique according to an exemplary embodiment.

A method of correcting the motion blur area may be a correcting method based on the PatchMatch technique. The PatchMatch technique, one of image editing techniques, may denote an image editing technique which replaces a selected area with a plurality of small areas (patches). For example, the PatchMatch technique may replace a certain object included in an image with a background image and may edit the image based on the certain object disappeared. Thus, the apparatus 100 may replace the motion blur area included in remaining images except the reference image with an area corresponding to the motion blur area included in the reference image, and correct the motion blur area included in the plurality of images via the PatchMatch technique. The motion blur area is corrected via the PatchMatch technique according to an exemplary embodiment; however, it will be understood by those of ordinary skill in the art that the motion blur area may be corrected via other image editing technique also.

Referring to FIG. 7, the apparatus 100 may correct the motion blur area of other images 720 through 740 based on the reference image 710. In greater detail, an arm portion 550 of a person which has been detected as the motion blur area in FIG. 5 has been corrected as similar to the arm portion of the person included in the reference image 710. Thus, when compared with FIG. 3, the motion blur areas in the plurality of images 710 through 740 are corrected.

Figure 8:
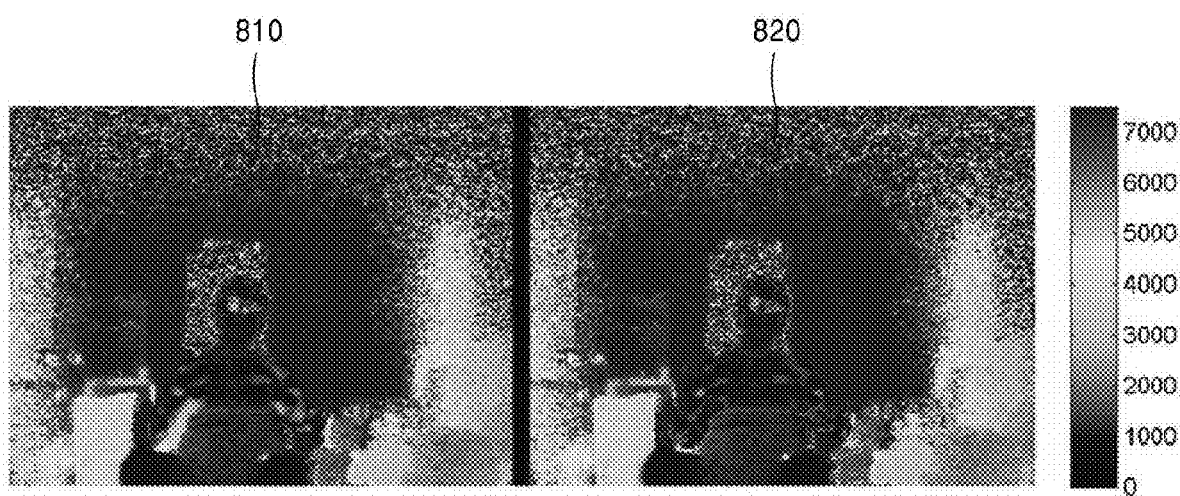
FIG. 8 illustrates depth images obtained via an original depth image and a corrected image of the motion blur area according to an exemplary embodiment.

FIG. 8 is illustrating depth images obtained via an original depth image and a corrected image of the motion blur area according to an exemplary embodiment.

Referring to FIG. 8, the depth image generated by using the plurality of images with the motion blur area un-corrected 810, shows that a depth level of the arm portion of the person is inaccurately displayed. However, the depth image generated by using corrected images with the motion blur area corrected 820 shows that the depth level of the arm portion of the person is more accurately displayed than the depth image with the motion blur area un-corrected 810 according to an exemplary embodiment.

FIG. 9 is a diagram illustrating an algorithm generating the depth image after removing the motion blur phenomenon according to an exemplary embodiment.

The algorithm illustrated in FIG. 9 is implemented in the open computer vision (OpenCV) language. The OpenCV is an open source computer vision C library with an emphasis on a real-time image processing. However, it will be understood by those with ordinary skill in the art that an algorithm to generate the depth image after having removed the motion blur phenomenon may be prepared in other language according to an exemplary embodiment.

Referring to FIG. 9, the algorithm according to an exemplary embodiment may output four images (Im0, Im90, Im180, and Im270) obtained via the emitted light with respective initial phases of 0°, 90°, 180°, and 270°, and three changed images (Im90_new, Im180_new, and Im270_new) and the depth image (I_depth) by receiving a maximum voltage value (maxV) and a minimum voltage value (minV) which are bases of a patch size (patchSize) and a normalization process.

Firstly, the motion blur area (blurMask) may be detected by using inputted four images via the algorithm according to an exemplary embodiment. After the motion blur area has been detected, the reference image may be normalized to an image having a voltage value between the maximum voltage value and the minimum voltage value (normalizeImage). Then, a histogram for a portion corresponding to the motion blur area from the normalized reference image may be prepared (imageHistgram).

In addition, after the histogram corresponding to the reference image has been prepared, processes of normalization and preparing the histogram for remaining images may be performed. In this case, the cumulative distribution function for remaining plurality of images except the reference image may be adjusted (performTransform) so that it is close to the cumulative distribution function for the reference image. After the cumulative distribution function has been adjusted, images with the motion blur area corrected may be generated (reconstrctImage) by editing (PatchMatch) with a consideration of the remaining plurality of images except the motion reference image and the patch size of an area corresponding to the motion blur area in the reference image via the PatchMatch technique.

After a process of generating images with the motion blur area corrected in the remaining plurality of images except the reference image has been repeatedly performed, depth information (I_depth) may be calculated via images (Im90_new, Im180_new, and Im270_new) with the motion blur area removed and the reference image (Im0).

Figure 10:
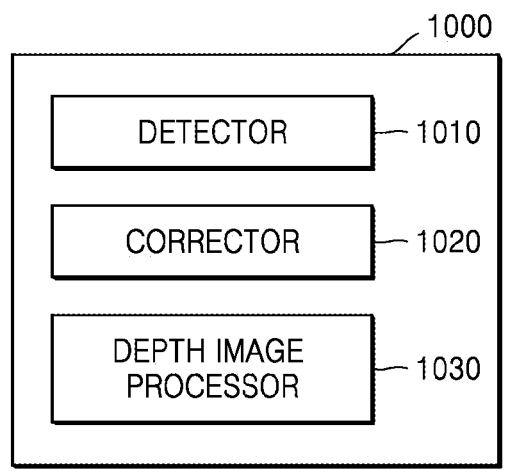
FIG. 10 is a block diagram illustrating an apparatus for obtaining a depth image according to an exemplary embodiment.

FIG. 10 is a block diagram illustrating an apparatus 1000 for obtaining a depth image according to an exemplary embodiment.

The apparatus 1000 for obtaining a depth image may include a detector 1010, a corrector 1020, and a depth image processor 1030. The detector 1010 may be implemented by a light receiver or a camera that may capture an image. The corrector 1020 and the depth image processor 1030 may be implemented by one or more microprocessors. Although FIG. 10 illustrates that the apparatus 100 includes three components 1010, 1020, and 1030, it will be understood by those of ordinary skill in the art that other general-purpose components may be further included in addition to components illustrated in FIG. 10.

The detector 1010 may detect a motion blur area based on a plurality of original images obtained from light emitted from the apparatus 1010 and then reflected from an object. The reflected light may include a plurality of different phases. For example, the plurality of original images may include a first original image corresponding to the emitted light with the initial phase of 0°, a second original image corresponding to the emitted light with the initial phase of 180° a third original image corresponding to the emitted light with the initial phase of 90° a fourth original image corresponding to the emitted light with the initial phase of 270°.

According to an exemplary embodiment, the detector 1010 may detect the motion blur area from the plurality of original images, when a difference between a first group, which denotes a sum of intensity of the reflected light corresponding to the first original image and the second original image based on Formula 1, and a second group, which denotes a sum of intensity of the reflected light corresponding to the third original image and the fourth original image based on Formula 1, is greater than or equal to a threshold value E.

According to another exemplary embodiment, when two arbitrary original images are selected from the plurality of original image and the intensity difference between the first area included in two original images and the reflected light corresponding to the first area is determined to be caused by a movement of the object, the detector 1010 may detect the first area as the motion blur area.

In this case, the motion blur area may denote an identical area in the plurality of original images.

The corrector 1020 may correct the motion blur area from compensated images generated by compensation after the original images are compensated for the intensity difference due to the initial phase difference of the reflected light reflected from the object. In addition, the corrector 1020 may select the reference image from the plurality of original images, and may adjust the cumulative distribution function for the intensity of the reflected light corresponding to remaining original images so that it is close to the cumulative distribution function for the intensity of the reflected light corresponding to the reference image. In addition, the corrector 1020 may generate images compensated for the intensity difference. In addition, the corrector 1020 may correct the motion blur area from compensated images via the PatchMatch technique.

The depth image processor 1030 may generate the depth image based on corrected images generated in correcting. When the apparatus 1000 generates four original images (e.g., the first through fourth original images) corresponding to the emitted light with respective initial phases of 0°, 90°, 180°, and 270°, and the corrected images (e.g., the second through fourth corrected images), the depth image processor 1030 may calculate depth information based on obtained phase information and modulation frequencies via the reflected light corresponding to the first original image and the reflected light corresponding to the second through fourth corrected images. In greater detail, depth information may be calculated via a formula below;

$$\text{Depth} = \frac{c}{4\pi f} \tan^{-1}\left(\frac{I_{CIS}^{(270)} - I_{CIS}^{(90)}}{I_{CIS}^{(0)} - I_{CIS}^{(180)}}\right) \quad \text{(Formula 4)}$$

In this case, c denotes the speed of light ($3*10^8$ m/s), f denotes a frequency of the emitted light, $I_{CIS}^{(\theta)}$ denotes the CIS output signal with the initial phase of $\theta$ degrees. According to an exemplary embodiment, $I_{CIS}^{(\theta)}$ may be a signal corresponding to the corrected image generated by removing the motion blur area.

Figure 11:
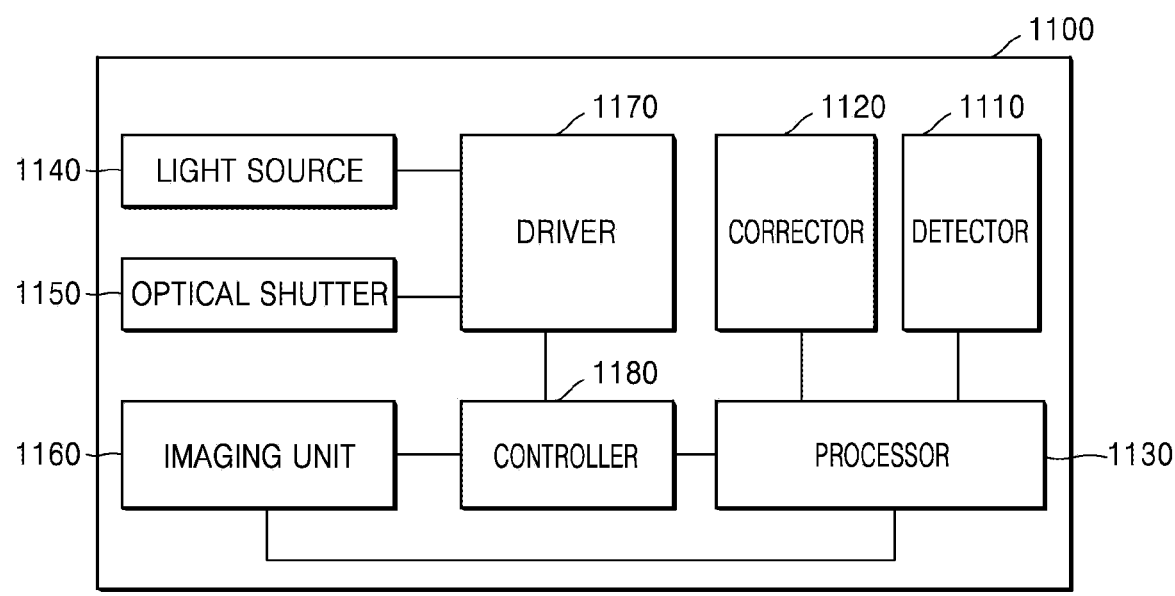
FIG. 11 is a block diagram illustrating an apparatus for obtaining a depth image according to another exemplary embodiment.

FIG. 11 is a block diagram illustrating an apparatus 1100 for obtaining a depth image according to another exemplary embodiment. According to an exemplary embodiment, an apparatus 1100 for obtaining a depth image may include a detector 1110, a corrector 1120, and a depth image processor 1130, and also a light source 1140, an optical shutter 1150, an imaging unit 1160, a driver 1170, and a controller 1180. It will be understood by those of ordinary skill in the art that other general-purpose components may be further included in addition to components illustrated in FIG. 11.

The detector 1110, the corrector 1120, and the depth image processor 1130 respectively correspond to the detector 1010, the corrector 1020, and the depth image processor 1030 in FIG. 10, and a detailed description will be omitted.

The light source 1140, the optical shutter 1150, the imaging unit 1160, and the driver 1170 respectively correspond to the light source 120, the optical shutter 130, the imaging unit 160, and the driver 140 in FIG. 1, and a detailed description will be omitted.

The controller 1180 may control the operation of the driver 1170 and the imaging unit 1160. In addition, the controller 1180 may the driver 1170 so that the emitted light with respective initial phases of 0°, 180°, 90°, and 270° is sequentially emitted. In this case, the plurality of original images may be the first original image corresponding to 0°, the second original image corresponding to 180°, the third original image corresponding to 90°, and the fourth original image corresponding to 270°.

Figure 12:
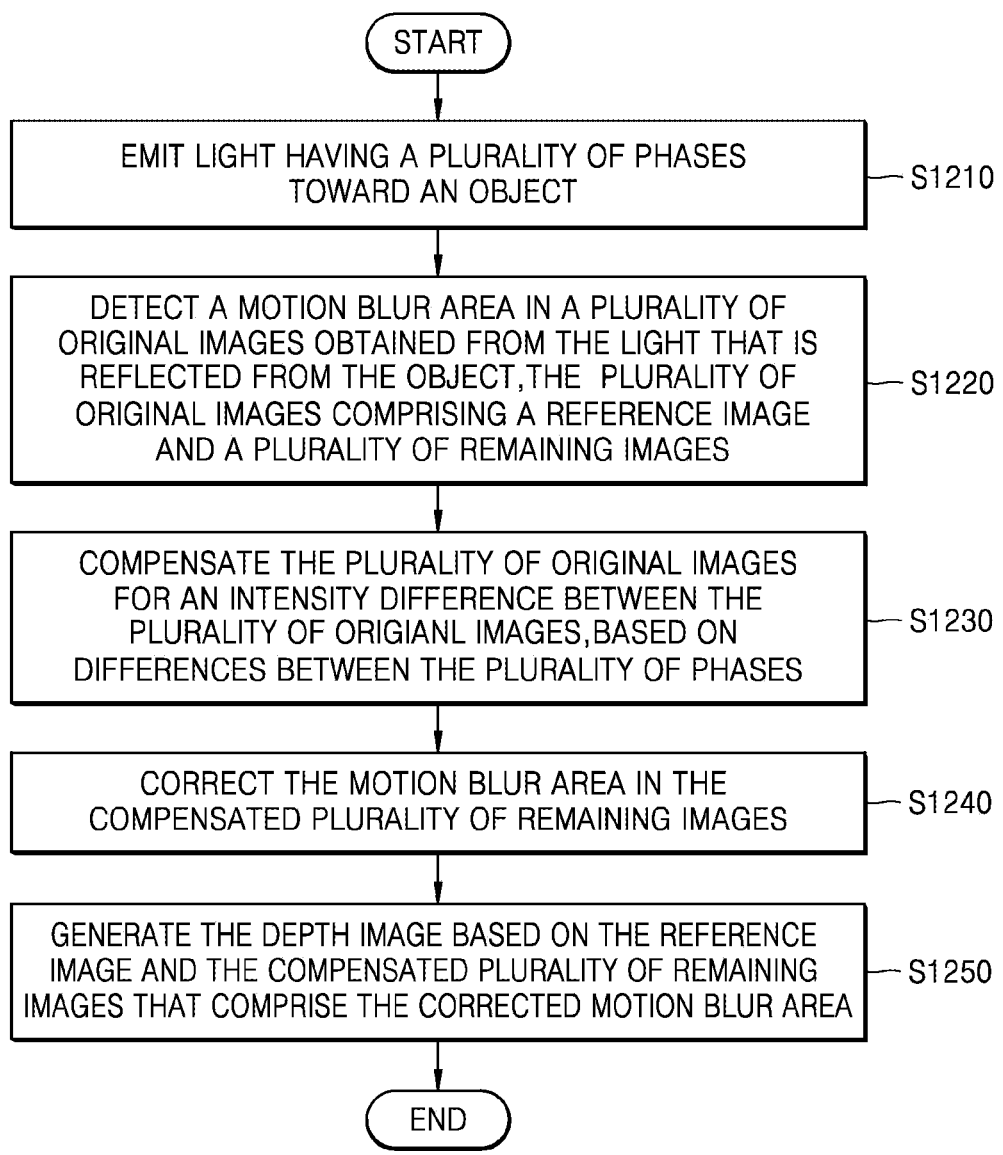
FIG. 12 is a flowchart of a method of obtaining a depth image via a time-of-flight (TOF) sensor according to an exemplary embodiment.

FIG. 12 is a flowchart of a method of obtaining the depth image via the TOF sensor according to an exemplary embodiment.

In operation S1210, the apparatus 1000 for obtaining a depth image may emit light having a plurality of phases toward an object.

In this case, the emitted light with different phases are sequentially emitted to the object, and the apparatus 1000 may use the plurality of original images obtained by modulating the reflected light via the optical shutter. In this case, initial phases of the emitted light are 0°, 180°, 90°, and 270°, and the plurality of original images may include the first original image corresponding to 0°, the second original image corresponding to 180°, the third original image corresponding to 90°, and the fourth original image corresponding to 270°.

In operation S1220, the apparatus 1000 for obtaining a depth image may detect the motion blur area in a plurality of original images obtained from the light that is reflected from the object, the plurality of original images comprising a reference image and a plurality of remaining images.

According to an exemplary embodiment, the apparatus 1000 may detect the motion blur area from the plurality of original images, when a difference between a first group, which denotes a sum of intensity of the reflected light corresponding to the first original image and the second original image based on Formula 1, and a second group, which denotes a sum of intensity of the reflected light corresponding to the third original image and the fourth original image based on Formula 1, is greater than or equal to a threshold value E.

According to another exemplary embodiment, when two arbitrary original images are selected from the plurality of original image and the intensity difference between the first area included in two original images and the reflected light corresponding to the first area is determined to be caused by a movement of the object, the apparatus 1000 may detect the first area as the motion blur area.

In this case, the motion blur area may denote an identical area in the plurality of original images.

In operation S1230, the apparatus 1000 may compensate the plurality of original images for an intensity difference between the plurality of original images, based on differences between the plurality of phases. For example, the apparatus 1000 may select the reference image from the plurality of original images, and may adjust the cumulative distribution function for the intensity of the reflected light corresponding to remaining original images so that it becomes close to the cumulative distribution function for the intensity of the reflected light corresponding to the reference image.

In operation S1240, the apparatus 1000 may correct the motion blur area in the compensated plurality of remaining images. The PatchMatch technique may be used to correct the motion blur area from the compensated images; however, it is not limited thereto.

In operation S1250, the apparatus 1000 may generate the depth image based on the reference image and the compensated plurality of remaining images that comprise the corrected motion blur area. In greater detail, the apparatus 1000 may generate the depth image via Formula 4.

Figure 13A:
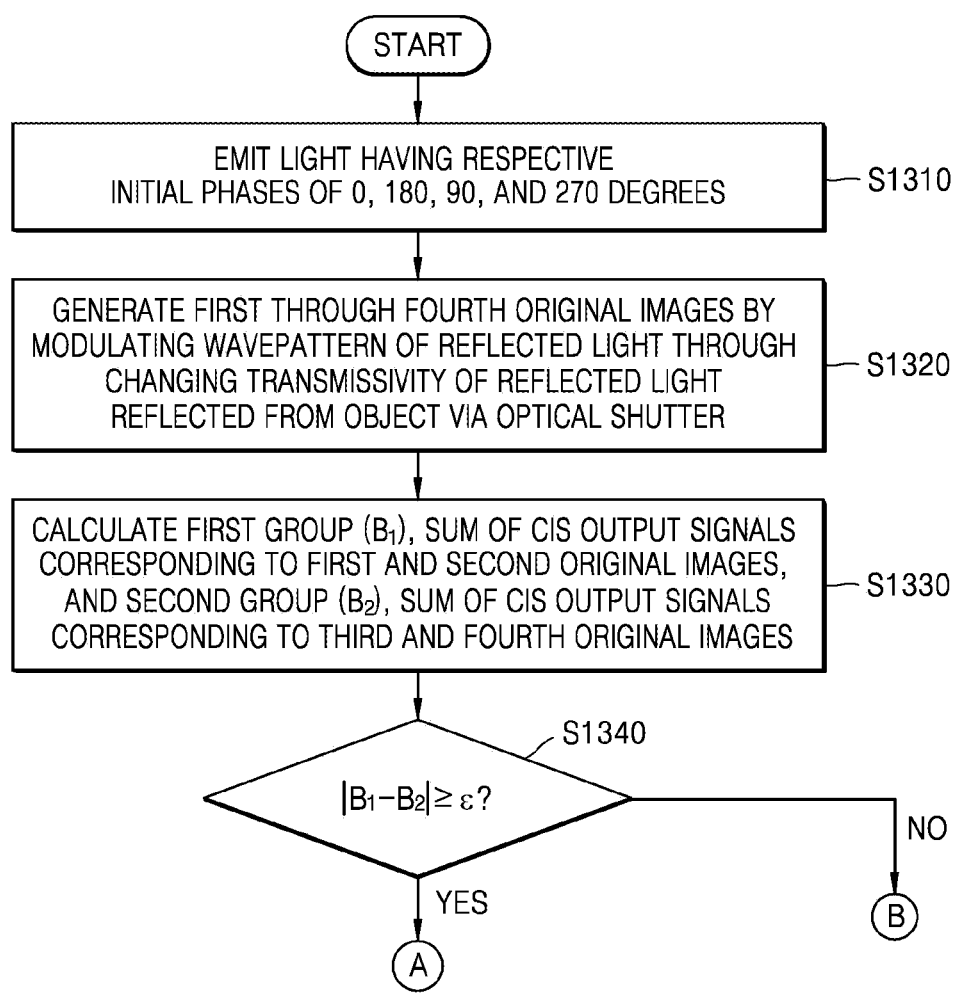
FIG. 13A is a detailed flowchart of a method of obtaining a depth image via the TOF sensor according to an exemplary embodiment.
Figure 13B:
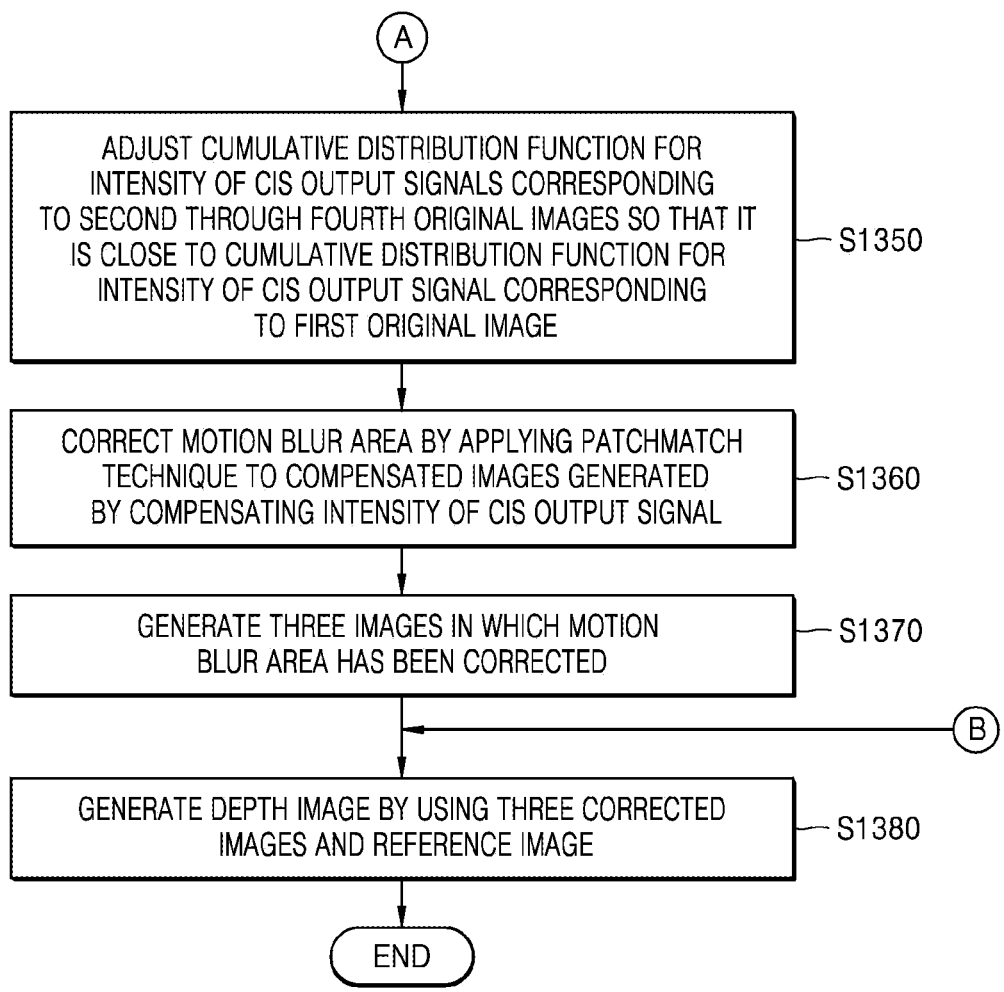
FIG. 13B is a detailed flowchart of a method of obtaining a depth image via the TOF sensor according to an exemplary embodiment.

FIGS. 13A and 13B are detailed flowcharts of methods of obtaining the depth image via the TOF sensor according to an exemplary embodiment.

In operation S1310, the light source 1140 may sequentially emit the light with respective initial phases of 0°, 180°, 90°, and 270° to the object.

In operation S1320, the apparatus 1100 may modulate the wave pattern of the reflected light by changing transmissivity of the reflected light reflected from the object via the optical shutter 1150. In addition, the imaging unit 1160 may generate the first through fourth original images with respective phases of 0°, 180°, 90°, and 270° by using the modulated, reflected light.

In operation S1330, the detector 1110 of the apparatus 1100 may calculate the first group $B_1$, which is a sum of CIS output signals corresponding to the first and second original images, and the second group $B_2$, which is a sum of CIS output signals corresponding to the third and fourth original images to detect the motion blur area. In greater detail, the first group $B_1$ and the second group $B_2$ may be calculated via Formulas 2 and 3, to detect the motion blur area.

In operation S1340, the detector 1110 of the apparatus 1100 may compare an absolute value of the difference between the first group $B_1$ and the second group $B_2$ with a threshold value E. When the absolute value is greater than the threshold value c, the area corresponding to the CIS output signal included in the first group $B_1$ and the second group $B_2$ may be determined as the motion blur area. However, when the absolute value is less than the threshold value c, the apparatus 1100 for obtaining a depth image may determine that there is no motion blur area.

In operation S1350, the corrector 1120 of the apparatus 1100 may adjust the cumulative distribution function for the intensity of the CIS output signal corresponding to the second through the fourth original image to be close to the cumulative distribution function for the intensity of the CIS output signal corresponding to the first image. In this case, the corrector 1120 of the apparatus 1100 may generate images compensated for the intensity difference.

In operation S1360, the corrector 1120 of the apparatus 1100 may correct the motion blur area in compensated images via the PatchMatch technique. In greater detail, the corrector 1120 may correct the motion blur area by applying the PatchMatch technique to the motion blur area included in the remaining compensated images (e.g., the second through fourth compensated images), based on the motion blur area of the reference image (e.g., the first compensated image). Various image editing techniques, in addition to the PatchMatch technique, may be used as methods for correcting the motion blur area; however, they are not limited thereto.

In operation S1370, the corrector 1120 of the apparatus 1100 may generate three corrected images in which the motion blur area has been corrected.

In operation S1380, the depth image processor 1130 of the apparatus 1100 may generate the depth image via three corrected images and the reference image. A method of generating the depth image may correspond to operation S1240 in FIG. 12, and a detailed description will be omitted.

While not restricted thereto, the operations or steps of the methods or algorithms according to the above exemplary embodiments may be realized in a type of recording medium including commands executable by a computer such as a program module to be executed by the computer. A non-transitory computer-readable recording medium may be an arbitrarily available medium accessible by the computer and may include all of a non-volatile medium and a separable and/or inseparable medium. In addition, the non-transitory computer-readable medium may include both a computer storage medium and a communication medium. The computer storage medium may include all of volatile and non-volatile media, and separable and inseparable media, which may be realized by an arbitrary method or technology of storing information such as computer-identifiable commands, data structures, program modules or other data. The communication medium may typically include other data in modulated data signals such as computer-identifiable commands, data structures or program modules, or other transmission mechanism, and may include an arbitrary information transmission medium.

Also, the operations or steps of the methods or algorithms according to the above exemplary embodiments may be written as a computer program transmitted over a computer-readable transmission medium, such as a carrier wave, and received and implemented in general-use or special-purpose digital computers that execute the programs. Moreover, it is understood that in exemplary embodiments, one or more units (e.g., detector 1010, corrector 1020, and depth image processor 1030 illustrated in FIG. 10) of the above-described apparatuses and devices can include or implemented by circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of obtaining a depth image, the method comprising:
   sequentially emitting light having a plurality of phases toward an object;
   generating a plurality of original images corresponding to the plurality of phases, based on the light that is sequentially reflected from the object;
   setting one of the plurality of original images as a reference image and setting the plurality of original images other than the reference image as a plurality of remaining images;
   correcting a motion blur area in the plurality of remaining images by compensating the plurality of remaining images for an intensity difference between the reference image and the plurality of remaining images, based on differences between a phase of the reference image and phases of the plurality of remaining images; and
   generating the depth image based on the reference image and the compensated plurality of remaining images that comprise the corrected motion blur area.

2. The method of claim 1, wherein the compensating comprises:
   adjusting a cumulative distribution function for an intensity of the reflected light corresponding to the plurality of remaining images based on a cumulative distribution function for an intensity of the reflected light corresponding to the reference image.

3. The method of claim 1, wherein the correcting the motion blur area comprises correcting the motion blur area based on a PatchMatch algorithm.

4. The method of claim 1, further comprising:
- selecting two original images from the plurality of original images; and
- detecting a first area as the motion blur area based on an intensity difference between the first area in the two original images.

5. The method of claim 1, wherein the motion blur area is determined as an identical area in the plurality of original images.

6. A non-transitory computer readable storage medium storing a program that is executable by a computer to perform the method of claim 1.

7. A method of obtaining a depth image, the method comprising:
- sequentially emitting light having a plurality of phases toward an object;
- modulating the light reflected from the object via an optical shutter to obtain a plurality of original images;
- detecting a motion blur area in the plurality of original images, the plurality of original images comprising a reference image and a plurality of remaining images;
- compensating the plurality of original images for an intensity difference between the plurality of original images, based on differences between the plurality of phases;
- correcting the motion blur area in the compensated plurality of remaining images; and
- generating the depth image based on the reference image and the compensated plurality of remaining images that comprise the corrected motion blur area,
- wherein the plurality of phases respectively correspond to phases of 0°, 90°, 180°, and 270°, and the plurality of original images comprise a first original image corresponding to the phase of 0°, a second original image corresponding to the phase of 180°, a third original image corresponding to the phase of 90°, and a fourth original image corresponding to the phase of 270°,
- wherein the first original image corresponds to the reference image, and
- wherein the second original image, the third original image, and the fourth original image correspond to the plurality of remaining images.

8. The method of claim 7, wherein the generating the depth image comprises calculating depth information, based on phase information and modulation frequencies obtained from the reflected light corresponding to the first original image and the reflected light corresponding to the second through fourth corrected images.

9. The method of claim 7, wherein the detecting the motion blur area comprises detecting the motion blur area from the plurality of original images, when a difference between a first group value, corresponding to a sum of an intensity of the reflected light corresponding to the first original image and the second original image, and a second group value, corresponding to a sum of an intensity of the reflected light corresponding to the third original image and the fourth original image, is greater than or equal to a threshold value.

10. An apparatus for obtaining a depth image, the apparatus comprising:
- a light source configured to sequentially emit light having a plurality of phases to an object;
- a detector configured to detect the light that is sequentially reflected from the object;
- a processor configured to:
  - generate a plurality of original images corresponding to the plurality of phases, based on the light that is sequentially reflected from the object;
  - set one of the plurality of original images as a reference image and set the plurality of original images other than the reference image as a plurality of remaining images;
  - correct a motion blur area in the plurality of remaining images by compensating the plurality of remaining images for intensity differences between the reference image and the plurality of remaining images, based on differences between a phase of the reference image and phases of the plurality of remaining images; and
- generate the depth image based on the reference image and the compensated plurality of remaining images that comprise the corrected motion blur area.

11. The apparatus of claim 10, wherein the processor is configured to adjust a cumulative distribution function for an intensity of the reflected light corresponding to the plurality of remaining images based on a cumulative distribution function for an intensity of the reflected light corresponding to the reference image.

12. The apparatus of claim 10, wherein the processor is configured to correct the motion blur area based on a PatchMatch algorithm.

13. The apparatus of claim 10, further comprising:
- an optical shutter configured to modulate wave patterns of the reflected light by changing a transmissivity of the reflected light; and
- an imaging unit configured to generate the plurality of original images via the reflected light modulated by the optical shutter.

14. The apparatus of claim 13, further comprising:
- a driver configured to apply driving voltages to the light source and the optical shutter; and
- a controller configured to control operations of the driver and the imaging unit.

15. The apparatus of claim 14, wherein the controller is further configured to control the driver so that the sequentially emitted light has phases of 0°, 180°, 90°, and 270°, respectively, and the plurality of original images comprise a first original image corresponding to the phase of 0°, a second original image corresponding to the phase of 180°, a third original image corresponding to the phase of 90°, and a fourth original image corresponding to the phase of 270°,
- wherein the first original image corresponds to the reference image, and
- wherein the second original image, the third original image, and the fourth original image correspond to the plurality of remaining images.

16. The apparatus of claim 15, wherein the processor is further configured to calculate depth information based on phase information and modulation frequencies obtained from the reflected light corresponding to the first original image and the reflected light corresponding to the second through fourth corrected images.

17. The apparatus of claim 15, wherein the detector is configured to detect the motion blur area from the plurality of original images, when a difference between a first group value, corresponding to a sum of an intensity of the reflected light corresponding to the first original image and the second original image, and a second group value, corresponding to a sum of an intensity of the reflected light corresponding to the third original image and the fourth original image, is greater than or equal to a threshold value.

18. The apparatus of claim 10, wherein the detector is further configured to select two original images from the plurality of original images and detect a first area as the motion blur area based on an intensity difference between the first area in the two original images.

19. The apparatus of claim 10, wherein the motion blur area is determined as an identical area in the plurality of original images.

* * * * *